US007424225B1

(12) United States Patent
Elliott

(10) Patent No.: US 7,424,225 B1

(45) Date of Patent: Sep. 9, 2008

(54) SYSTEMS AND METHODS FOR IMPLEMENTING CONTENTION-BASED OPTICAL CHANNEL ACCESS

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 521 days.

(21) Appl. No.: 10/715,751

(22) Filed: Nov. 17, 2003

(51) Int. Cl.
*H04B 10/00* (2006.01)

(52) U.S. Cl. ....................... 398/115; 398/118; 398/126; 398/129; 398/125

(58) Field of Classification Search ................. 370/328, 370/338, 351; 398/115, 64, 67, 70, 72, 74, 398/110, 121, 116, 123, 126, 128
See application file for complete search history.

(56) References Cited

U.S. PATENT DOCUMENTS 5,390,040 A * 2/1995 Mayeux ....................... 398/129
5,787,077 A * 7/1998 Kuehnel et al. ............. 370/331
6,323,980 B1 * 11/2001 Bloom ....................... 398/129
6,347,001 B1 * 2/2002 Arnold et al. ............... 398/122
6,788,898 B1 * 9/2004 Britz et al. ..................... 398/70
6,931,232 B1 * 8/2005 Wolcott ...................... 455/12.1
7,190,672 B1 * 3/2007 Whitehill .................... 370/235
2002/0080755 A1 * 6/2002 Tasman et al. .............. 370/338
2003/0190168 A1 * 10/2003 Song et al. .................. 398/168
2004/0076164 A1 * 4/2004 Vanderveen et al. ........ 370/400

OTHER PUBLICATIONS

U.S. Patent Application entitled "Systems and Methods for Implementing Coordinated Optical Channel Access"; filed herewith; Brig Barnum Elliott.; 45 pages, Nov. 17, 2003.
U.S. Patent Application entitled "Optical AD-HOC Networks"; filed herewith; Brig Barnum Elliott; 47 pages, Nov. 17, 2003.

* cited by examiner

*Primary Examiner*—Dalzid Singh
(74) *Attorney, Agent, or Firm*—Ropes & Gray LLP

(57) ABSTRACT

A first node (205) in a network includes a non-optical transceiver (415) and an optical subsystem (410). The non-optical transceiver (415) sends a request message to establish an optical link from the first node (205) to a second node via electrical signals over an electrically transmissive medium. The optical subsystem (410) establishes an optical link between the first node and the second node based on the receipt of the request granted message and transmits data between the first node and the second node via optical signals over the optical link.

25 Claims, 9 Drawing Sheets

SYSTEMS AND METHODS FOR IMPLEMENTING CONTENTION-BASED OPTICAL CHANNEL ACCESS

RELATED APPLICATIONS

The present application is related to commonly assigned U.S. patent application Ser. No. 10/716,270, entitled "Optical Ad-Hoc Networks," and filed on Nov. 17, 2003; and commonly assigned U.S. patent application Ser. No. 10/715,738, entitled "Systems and Methods for Implementing Coordinated Optical Channel Access," and filed on Nov. 17, 2003, the disclosures of which are hereby incorporated herein by reference in their respective entireties.

FIELD OF THE INVENTION

The present invention relates generally to ad-hoc networks and, more particularly, to systems and methods for implementing contention-based optical channel access in ad-hoc networks.

BACKGROUND OF THE INVENTION

Wireless data communication is often required in an environment where communications infrastructure, such as base stations or a wired backbone network, does not exist, or is not economical or is impractical to use. For example, in military or emergency environments, adequate infrastructure often does not exist in necessary locations and constructing such an infrastructure would be either impractical or not economical for the short-term use that is often required. Mobile multi-hop radio frequency (RF) wireless networks have, therefore, been developed to provide wireless data communications in such environments.

In a conventional mobile RF wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop RF wireless network to perform effectively, all nodes must, therefore, be prepared to route packets on behalf of other nodes.

One drawback back with conventional multi-hop RF wireless networks is that the RF channel that is used to transmit data, such as packet data, can be relatively slow (e.g., kilobits or megabits per second of data throughput). Therefore, it would be desirable to employ other transmission mediums for transmitting data that can transmit data at much higher throughputs, such as, for example, multiple gigabits per second of data throughput.

SUMMARY OF THE INVENTION

Systems and methods consistent with the present invention implement mechanisms for employing ad-hoc optical links and channels for transmitting data in an ad-hoc network. Optical links, consistent with the invention, permit very high throughputs, such as multiple gigabits per second, in an ad-hoc environment, where nodes may be moving around and links may be created and terminated with a high degree of frequency. The ad-hoc optical links of the present invention may be created automatically between two nodes in response to the traffic that the two nodes must convey. In an ad-hoc network consistent with the invention, any given node may attempt to establish an optical link to any other node in range whenever it wishes.

Systems and methods consistent with the present invention may use a hybrid RF/optical channel access scheme, where nodes use RF messaging to request access to the optical channels and, in response to the RF messaging, the ad-hoc nodes may establish optical links for high-speed communication via optical channels. In some exemplary embodiments, establishment of the optical links may include steering of one or more optical apertures, such as, for example, an optical telescope, to point towards the node to which an optical link is going to be established. Steering of the optical aperture may, thus, permit optical link establishment with mobile optical nodes that may frequently change position.

In accordance with the purpose of the invention as embodied and broadly described herein, a method of implementing optical channel access in a network that includes multiple distributed nodes includes requesting the optical channel access via radio-frequency (RF) messaging from one or more of the multiple distributed nodes. The method further includes granting the optical channel access to at least one of the multiple distributed nodes based on the RF messaging.

In another implementation consistent with the present invention, a method of establishing an optical link between a first node and a second node in a network, wherein at least one of the first and second nodes comprises a mobile node, is provided. The method includes sending a request message to establish the optical link from the first node to the second node via electrical signals over an electrically transmissive medium and receiving a request denied or a request granted message from the second node via electrical signals over the electrically transmissive medium. The method further includes establishing the optical link between the first node and the second node based on the receipt of the request granted message and transmitting data between the first node and the second node via optical signals over the optical link.

In a further implementation consistent with the present invention, a method of communicating between first and second nodes in a network is provided. The method includes establishing an optical channel between the first and second nodes by transmitting electrical signals over a non-optical channel. The method further includes communicating via the established optical channel between the first and second nodes.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention implement a hybrid RF/optical channel access scheme that may be employed in a multi-hop, ad-hoc network. The use of optical links for transmission of significant quantities of data, as opposed to conventional RF links, permits very high throughputs, on the order of multiple gigabits per second, in an ad-hoc environment where nodes may be moving around and links may be created and terminated with a high degree of frequency.

Exemplary Network

Figure 1:
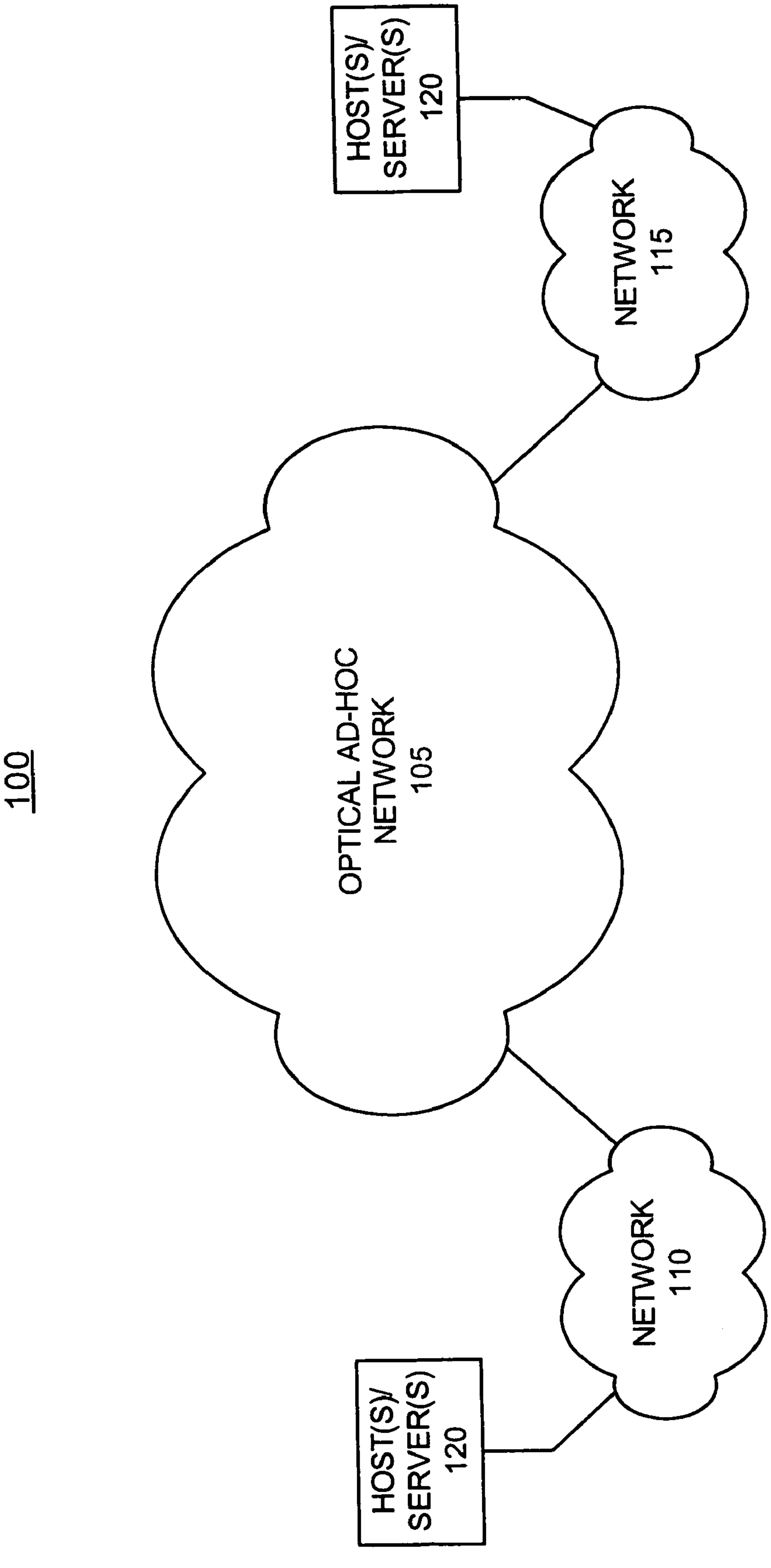
FIG. 1 illustrates an exemplary network in which systems and methods, consistent with the present invention, may be implemented.

FIG. 1 illustrates an exemplary network 100 in which systems and methods may implement contention-based optical channel access consistent with the present invention. Network 100 may include an optical ad-hoc sub-network 105, sub-networks 110 and 115 and host(s)/server(s) 120. Optical ad-hoc sub-network 105 may include a multi-hop, ad-hoc, optical packet-switched network. In other implementations consistent with the invention, sub-network 105 may include other types of networks, such as, for example, a circuit-switched network. Optical ad-hoc sub-network 105 may interconnect with sub-networks 110 and 115 via wired, wireless or optical links.

Sub-networks 110 and 115 may include one or more networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks. One or more hosts and/or servers 120 may interconnect with sub-networks 110 and 115.

Figure 2:
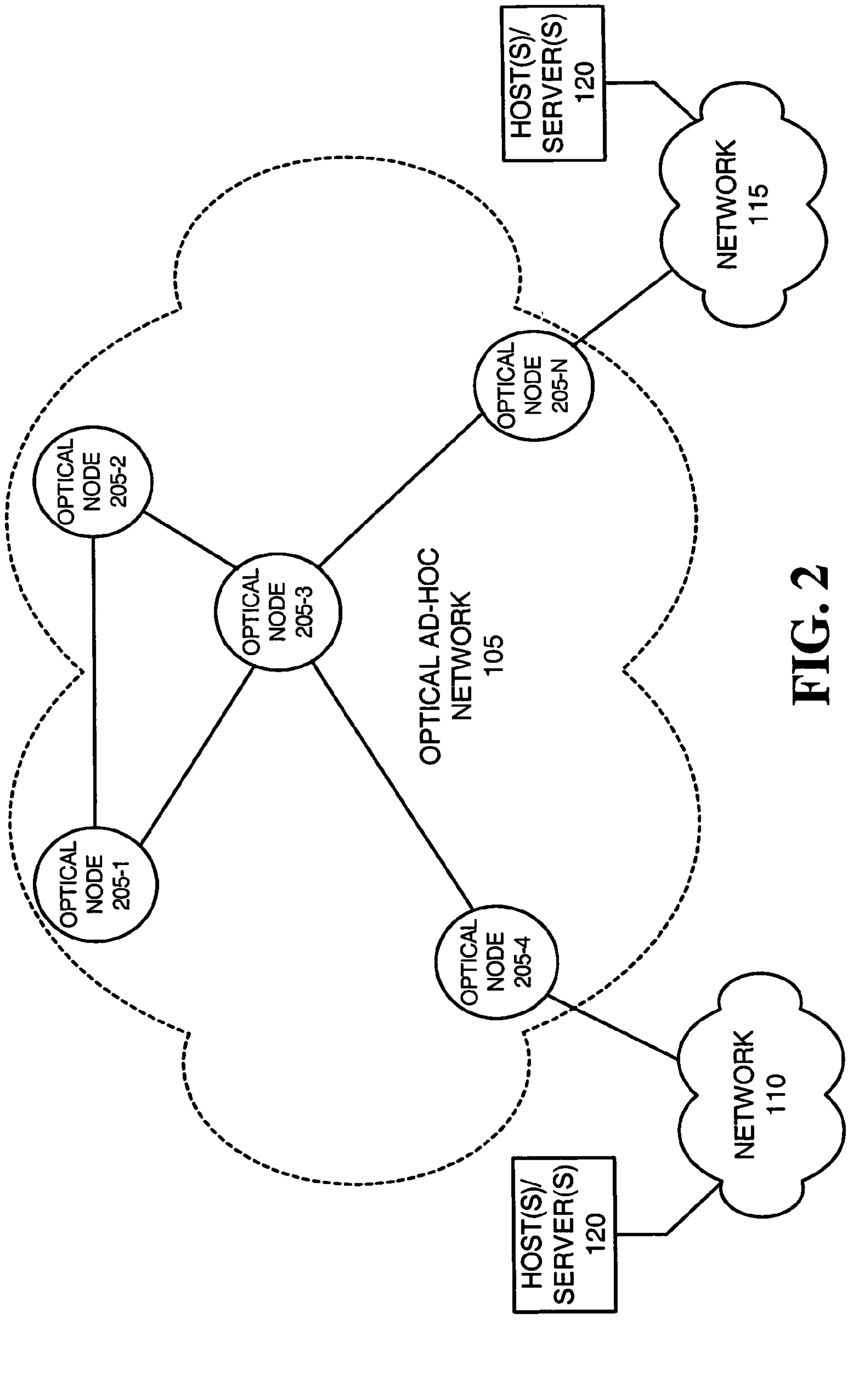
FIG. 2 illustrates optical nodes of the exemplary optical ad-hoc network of FIG. 1 consistent with the present invention.

As shown in FIG. 2, optical ad-hoc sub-network 105 may include multiple optical nodes 205-1 through 205-N (collectively referred to as optical nodes 205) that each may have the capability to communicate via, for example, both radio-frequency (RF) and optical links. The optical links may include one or more optical channels that may carry light throughout the electromagnetic spectrum, including light in the human visible spectrum and light beyond the human-visible spectrum, such as, for example, infrared or ultraviolet light. The optical links may include a free-space optical path, such as, for example, a path through the atmosphere or outer space, or even through water (e.g., below the sea) or other transparent media. The RF links may include one or more RF channels that consist of some time, frequency or code division multiplexed portion of an RF spectrum.

In a multi-hop, ad-hoc, optical packet-switched network, each optical node 205 of sub-network 105 may route packets on behalf of other optical nodes and, thus, serve as an intermediate node between a packet source optical node and a destination optical node in sub-network 105. Each optical node 205 may include a mobile entity, such as, for example, an automobile, an airplane, a helicopter, a missile or a satellite. Each optical node 205 may further include a stationary, or semi-stationary entity, such as, for example, a ground station, a cellular base station or a stationary satellite. Each optical node 205 may communicate with another optical node via an optical link established using, for example, a steerable aperture (not shown). The number of optical nodes 205 shown in FIG. 2 is for illustrative purposes only. Fewer or greater numbers of optical nodes 205 may be employed in optical ad-hoc sub-network 105 consistent with the present invention.

Figure 3:
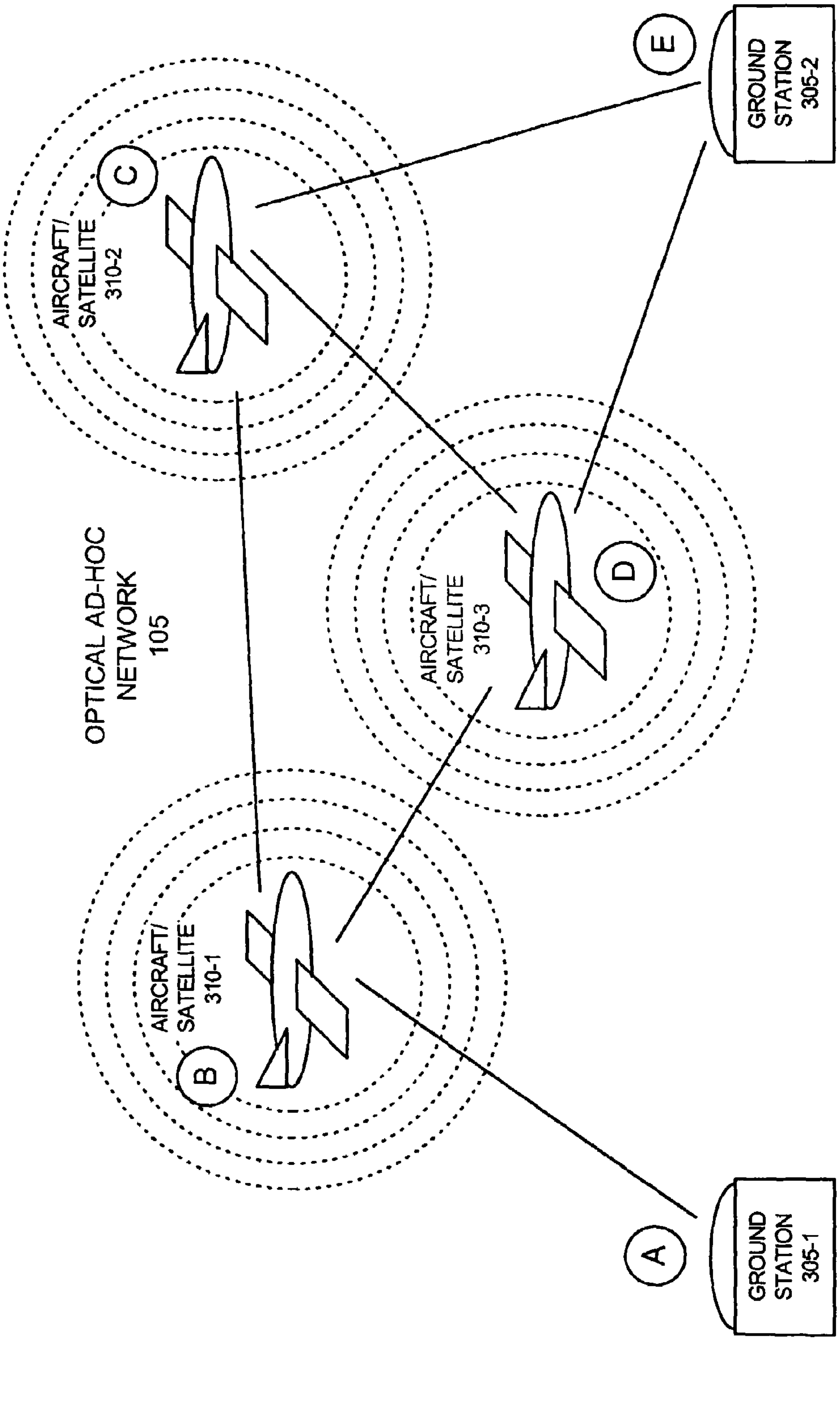
FIG. 3 illustrates one exemplary implementation, consistent with the present invention, in which optical nodes of the optical ad-hoc network include aircraft and/or satellites.

FIG. 3 illustrates one exemplary embodiment of the invention in which the optical nodes 205 of optical sub-network 105 may include ground stations 305-1 through 305-2 and aircraft/satellites 310-1 through 310-3. Ground station 305-1 (node A) may establish an optical link with node B 310-1. Node B 310-1 may further establish an optical link with nodes C 310-2 and D 310-3. Node C 310-2 may establish an optical link with ground station 305-2 (node E) and node D 310-3 may also establish an optical link with node E 305-2. In accordance with the exemplary embodiment of FIG. 3, data may be transmitted using ad-hoc optical links between ground stations 305-1 and 305-2 via nodes B 310-1, C 310-2 and D 310-3.

Exemplary Optical Node

Figure 4:
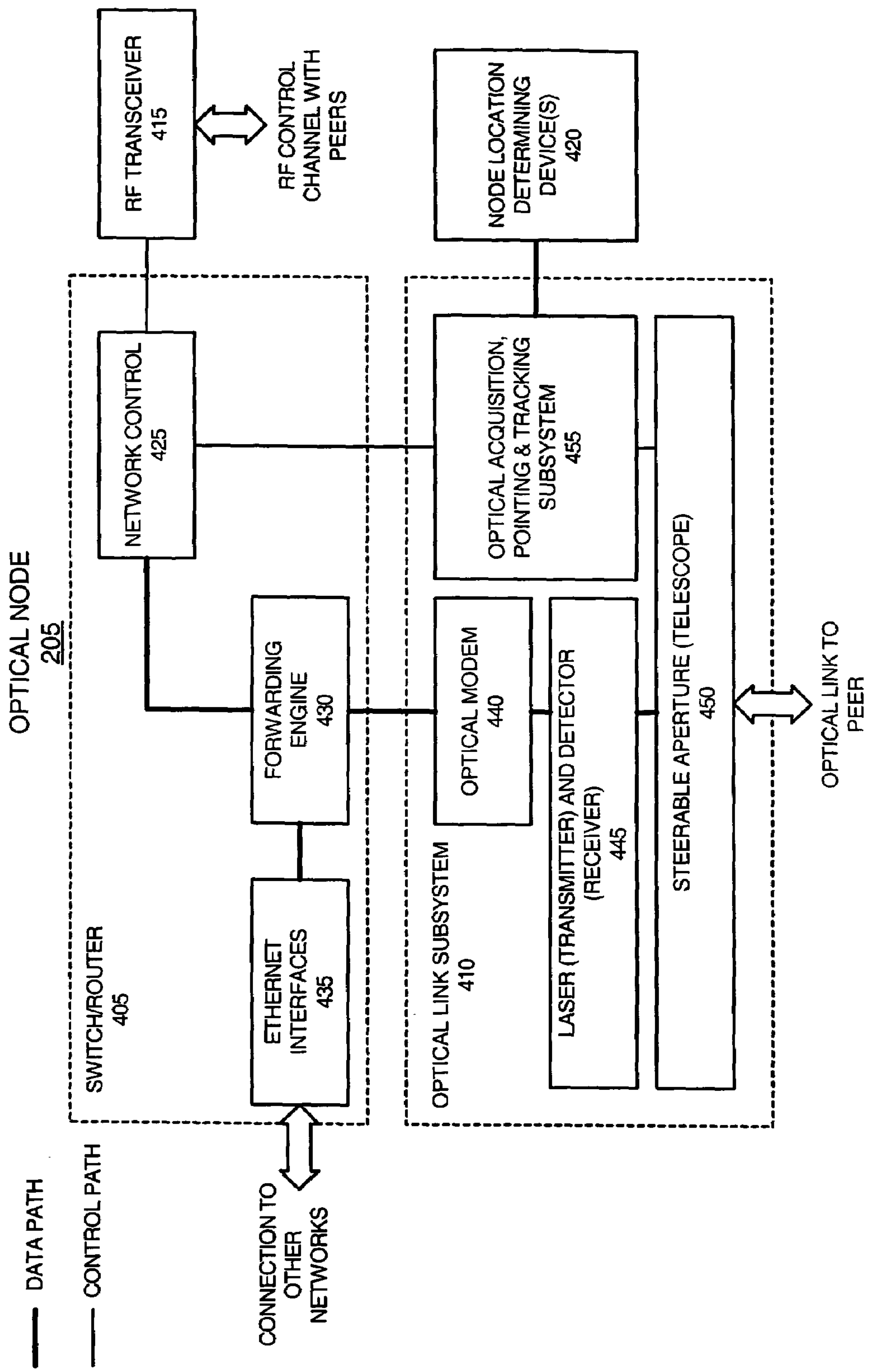
FIG. 4 illustrates exemplary components of an optical node of the optical ad-hoc network of FIG. 2 consistent with the present invention.

FIG. 4 illustrates exemplary components of an optical node 205 consistent with the invention. An optical node 205 may include a switch/router 405, an optical link subsystem 410, a RF transceiver 415 and a node location determining device(s) 420. Though only a single optical link subsystem 410 is shown in FIG. 4, multiple (i.e., at least two) optical link subsystems 410 may be included in each optical node 205.

Switch/router 405 may include a network control computer 425, a forwarding engine 430 and Ethernet interfaces 435. Network control computer 425 may execute the ad-hoc routing protocols and manage the ad-hoc network topology. Forwarding engine 430 may forward data through the ad-hoc sub-network 105 in accordance with routing data accumulated by network control computer 425. Network control computer 425 and forwarding engine 430 may be linked by any form of communication mechanism, such as, for example, an Ethernet or a PCI bus backplane. Ethernet interfaces 435 may interconnect optical node 205 with other networks, such as, for example, sub-networks 110 and 115.

Optical link subsystem 410 may include an optical modem 440, a laser (transmitter) and detector (receiver) 445, a steerable aperture 450, and an optical acquisition, pointing and tracking subsystem 455. Optical link subsystem 410 may "plug in" to forwarding engine 430 by a standard interface such as, for example, an Ethernet interface. Optical modem 440 may include conventional mechanisms for controlling the transmission and reception of data via optical pulses, such as, for example, mechanisms for modulating/demodulating an optical beam, and for implementing error correction, interleaving, etc., as required for reliable communication. Laser and detector 445 may include conventional lasers for transmitting optical pulses and conventional detectors for detecting optical pulses received from another optical node 205 as directed by optical modem 440. Steerable aperture 450 may include, for example, a telescope, for establishing an optical link in a specified direction from optical node 205. Optical acquisition, pointing and tracking subsystem 455 may keep track of the location, velocity and/or acceleration of neighboring optical nodes such that it can provide instructions to steer steerable aperture 450 to establish optical links with the neighboring nodes.

RF transceiver 415 may include conventional circuitry for communicating via radio frequencies. In one implementation consistent with the invention, RF transceiver 415 may include a RF transmit/receive suite, its associated electronics, and an omni-directional antenna (not shown). RF transceiver 415 may operate, in some implementations, in accordance with IEEE standard 802.11. RF transceiver 415 may include any type of RF radio device that runs in any RF spectrum. For example, RF transceiver 415 may run in the VHF, UHF, L, either of the ISM bands, or any other RF band.

Node location determining device(s) 420 may include one or more devices that provide node geographic location data. Device(s) 420 may include one or more of a Global Positioning System (GPS) device, an inertial management unit, or a vehicle navigation unit that provide a location of optical node 205. Location determining device(s) 420 may determine a current latitude, longitude and altitude of optical node 205. Location determining device(s) 420 may further determine a three-dimensional velocity vector and, possibly, a three-dimensional acceleration vector, associated with optical node's 205 current motion relative to a fixed point, such as, for example, the earth.

In other implementations consistent with the invention, if device(s) 420 includes a GPS device, then device 420 may supply geographic positions in global coordinates, such as standard world models like the World Geodetic System (WGS 84) or the Military Grid Reference System (MGRS). The World Geodetic System designates coordinates in latitude and longitude in degrees, and height over the geoid (mean sea level) in meters. The MGRS is based on the Universal Transverse Mercator (UTM) projection from 84 degrees north to 80 degrees south. In MGRS, the earth's surface is sliced into sixty North-South "orange slices," with each slice being six degrees wide and projected onto a flat plane with coordinates Easting (distance in meters from the local meridian, which is centered every 6 degrees), Northing (distance in meters from the equator), and altitude (meters above sea level). MGRS has the advantage of providing genuine "local flat earth" three-vectors aligned with East (E), North (N) and up (U), suitable for local ballistics, intervisibility and other computations.

Location determining device(s) 420 may further keep track of optical node's 205 current pitch, roll and yaw. Pitch, roll and yaw may be determined from conventional sensor technology.

Exemplary Vehicle Coordinate System

Figure 5:
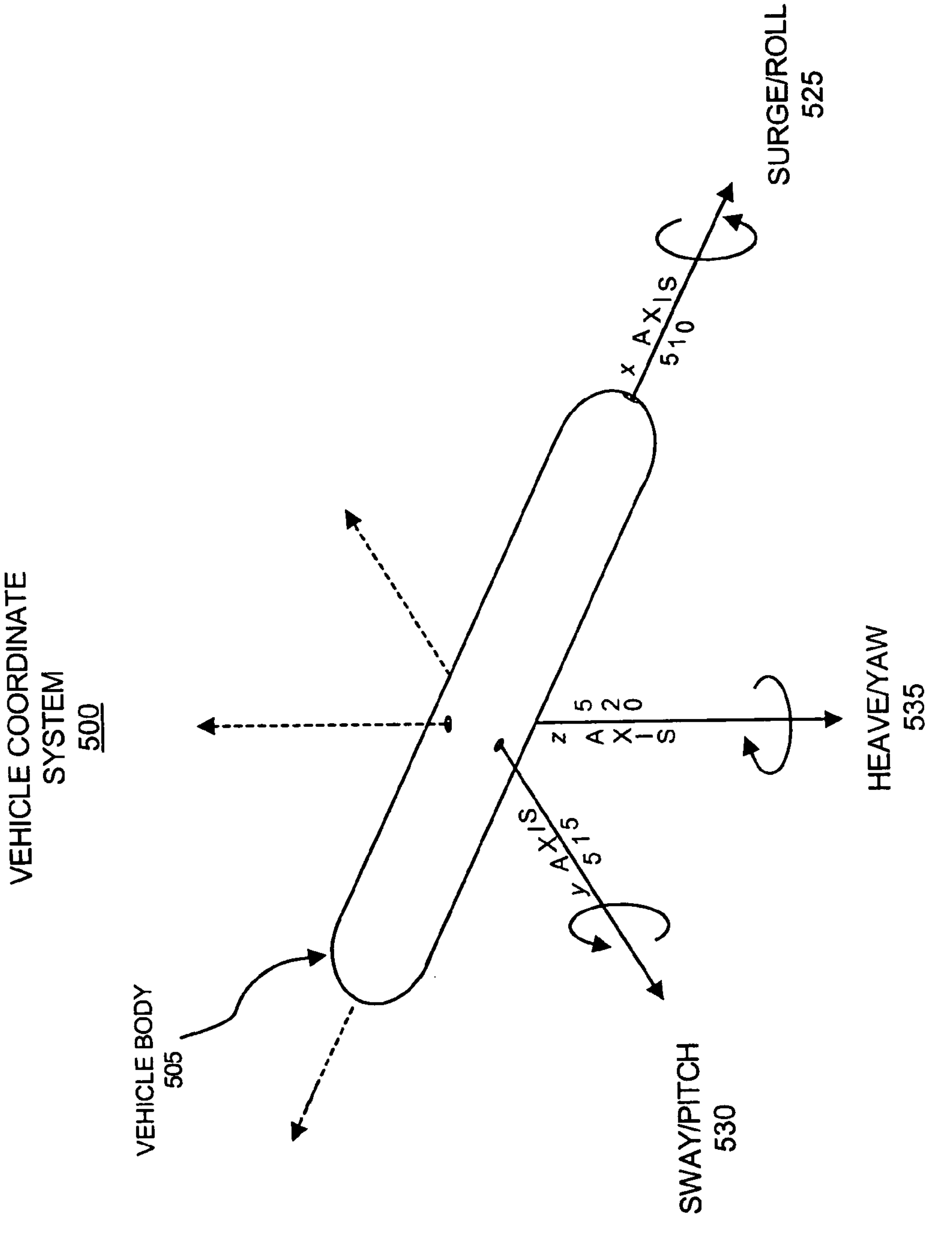
FIG. 5 illustrates an exemplary vehicle coordinate system, that may be associated with individual optical nodes of FIG. 2, consistent with the present invention.

FIG. 5 illustrates an exemplary vehicle coordinate system 500, that may be associated with one or more optical nodes 205 of optical ad-hoc sub-network 105, consistent with the invention. As shown, a vehicle body 505 for each optical node 205 has a local coordinate system in which the positive x axis 510 may be in the vehicle forward direction, the positive y axis 515 may be to the right of the vehicle forward direction, and the positive z axis 520 may be down. As with conventional aerospace standards, a number of motions may be associated with each axis. For example, surge/roll motions 525 may be associated with x axis 510, sway/pitch motions may be associated with y axis 515 and heave/yaw motions 535 may be associated with z axis 520. As shown in FIG. 5, the vehicle coordinate system includes a right-handed coordinate system, where rotations about the axes are also right handed. "Strap-down" sensors, such as, for example, an acceleration sensor and a magnetic field sensor may measure components of external vectors (e.g., gravity, magnetic field) relative to the local vehicle coordinate system x 510, y 515 and z 520 axes.

Exemplary Request-to-Send Message

Figure 6:
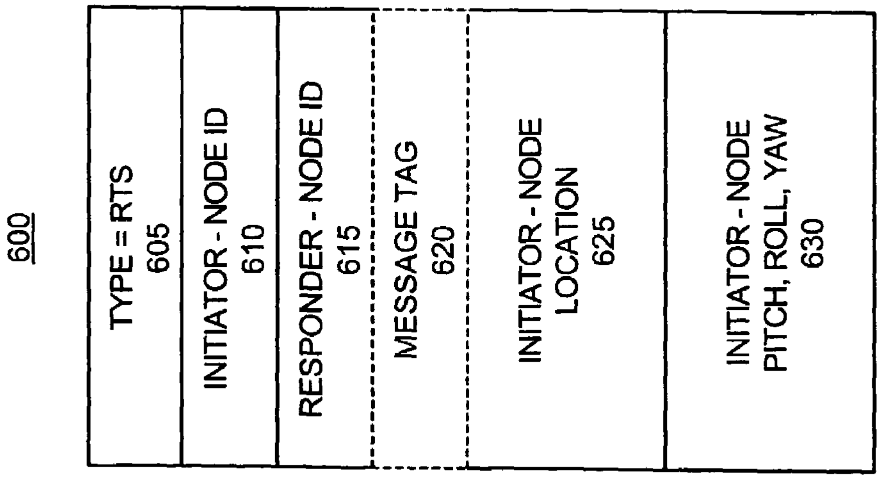
FIG. 6 illustrates an exemplary "request to send" message, consistent with the present invention, for requesting the establishment of an optical link between optical nodes.

FIG. 6 illustrates an exemplary request-to-send (RTS) message 600 that may be sent from an initiator optical node to a responder optical node for the purpose of requesting the establishment of an optical link between the two optical nodes. RTS message 600 may include a message type field 605, an initiator node identifier (ID) field 610, a responder node ID field 615, an optional message tag field 620, an initiator node location field 625 and an initiator node pitch, roll and yaw field 630.

Message type field 605 may designate message 600 as a request-to-send message. Initiator node ID field 610 may include a unique identifier associated with the optical node that is initiating the optical link establishment request (e.g., the initiator node). Responder node ID field 615 may include a unique identifier associated with the optical node to which the optical link establishment request is being sent. Message tag field 620 may include any type of identifier for identifying a particular RTS/CTS interaction, such as, for example, a sequence number, a unique identifier, a challenge/response field, etc. Initiator node location field 625 may include data identifying a geographic location of the initiator optical node. Such geographic location data may include, for example, a latitude, longitude and altitude associated with the location of the initiator node. Node location field 625 may be derived from data from node location determine device(s) 420. In some exemplary embodiments, node location data field 625 may additionally include a three-dimensional velocity vector and, possibly, a three-dimensional acceleration vector that indicates a current motion associated with the initiator node. Initiator node pitch, roll and yaw field 630 may include data identifying pitch, roll and/or yaw motions of a vehicle body associated with the initiator optical node. The pitch, roll and yaw data field 630 may be encoded in any number of conventional ways.

Exemplary Clear-to-Send Message

Figure 7:
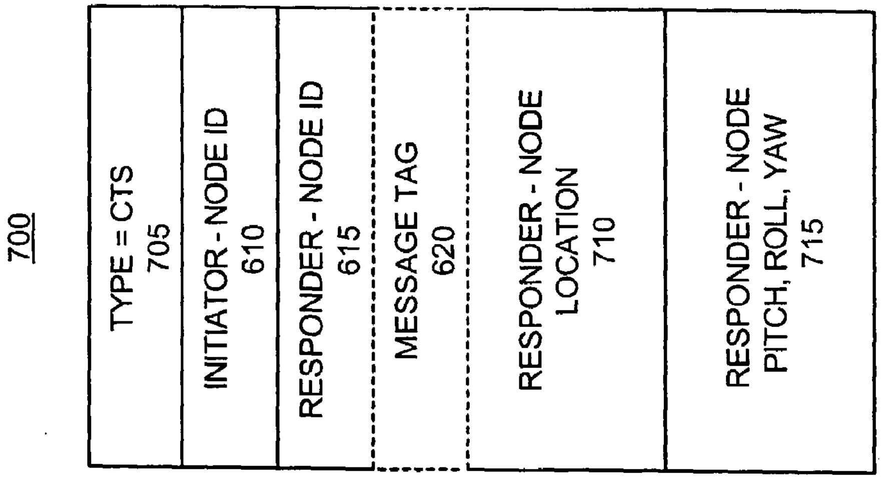
FIG. 7 illustrates an exemplary. "clear to send" message, consistent with the present invention, for agreeing to the establishment of an optical link between optical nodes.

FIG. 7 illustrates an exemplary clear-to-send (CTS) message 700 that may be sent from a responder optical node back to an initiator optical node, in response to an RTS message 600 from the initiator optical node, agreeing to establish an optical link with the initiator optical node. CTS message 700 may include a message type field 705, an initiator node ID field 610, a responder node ID field 615, an optional message tag field 620, a responder node location field 710 and a responder node pitch, roll and yaw field 715.

Message type field 705 may designate message 700 as a clear-to-send message. Responder node location field 710 may include data identifying a geographic location of the responder optical node. Such geographic location data may include, for example, a latitude, longitude and altitude associated with the location of the responder node. Node location field 710 may be derived from data from node location determining device(s) 420 of the responder optical node 205. In some exemplary embodiments, node location data field 710 may additionally include a three-dimensional velocity vector and, possibly, a three-dimensional acceleration vector that indicates a current motion associated with the initiator node. Responder node pitch, roll and yaw field 715 may include data identifying pitch, roll and/or yaw motions of a vehicle associated with the responder optical node. The pitch, roll and yaw data field 715 may be encoded in any number of conventional ways. Fields 610-620 are similar to those discussed with respect to RTS message 600.

Exemplary Reject Message

Figure 8:
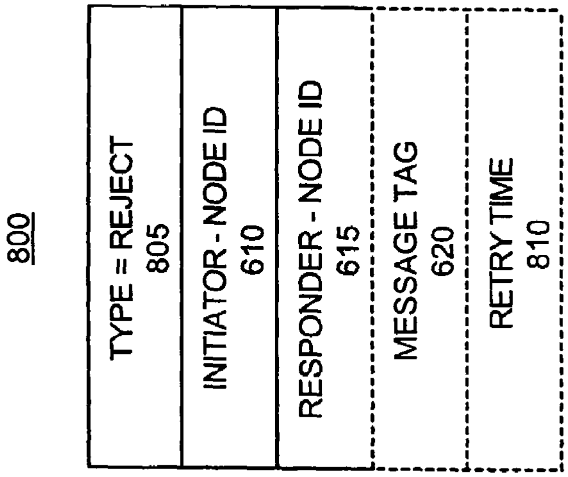
FIG. 8 illustrates an exemplary "reject" message, consistent with the present invention, for rejecting the establishment of an optical link between optical nodes.

FIG. 8 illustrates an exemplary reject message 800 that may be sent from a responder optical node back to an initiator optical node, in response to an RTS message 600 from the initiator optical node, rejecting the establishment of an optical link with the initiator optical node. Reject message 800 may include a message type field 805, an initiator node ID field 610, a responder node ID field 615, an optional message tag field 620 and an optional retry time field 810. Message type field 805 may designate message 800 as a reject message. Retry time field 810 may include scheduling information that identifies when the initiator optical node should attempt to send another request-to-send message. The scheduling information may include, for example, a "wall clock time" (e.g., 09:35:17), or it may be a relative time, e.g., a number of milliseconds from a reference time when the RTS retry should be made. Fields 610-620 are similar to those discussed with respect to RTS message 600.

Exemplary Optical Link Establishment and Tear Down Process

Figure 9:
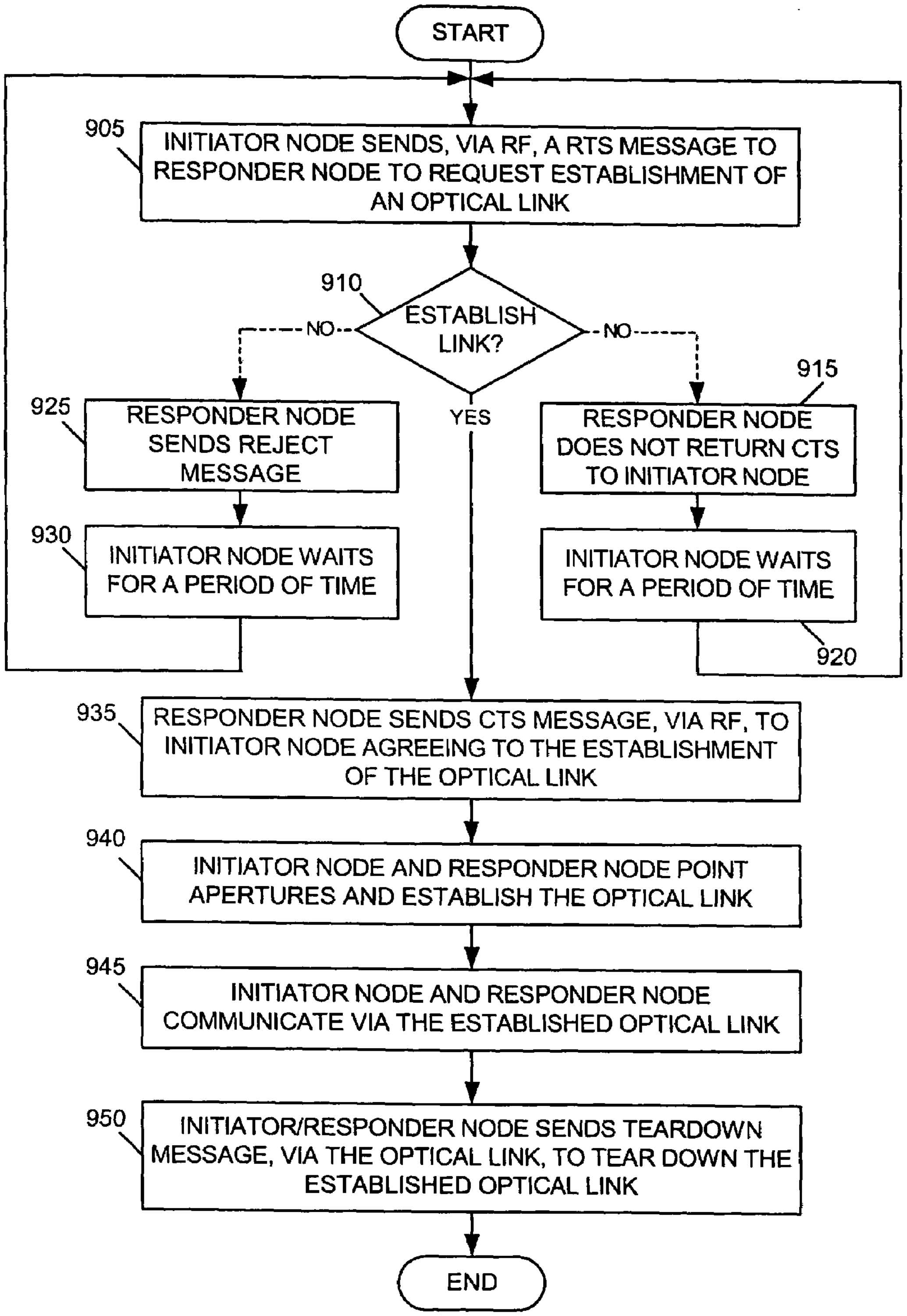
FIG. 9 is a flow chart that illustrates an exemplary optical link establishment and tear down process consistent with the present invention.
Figure 10:
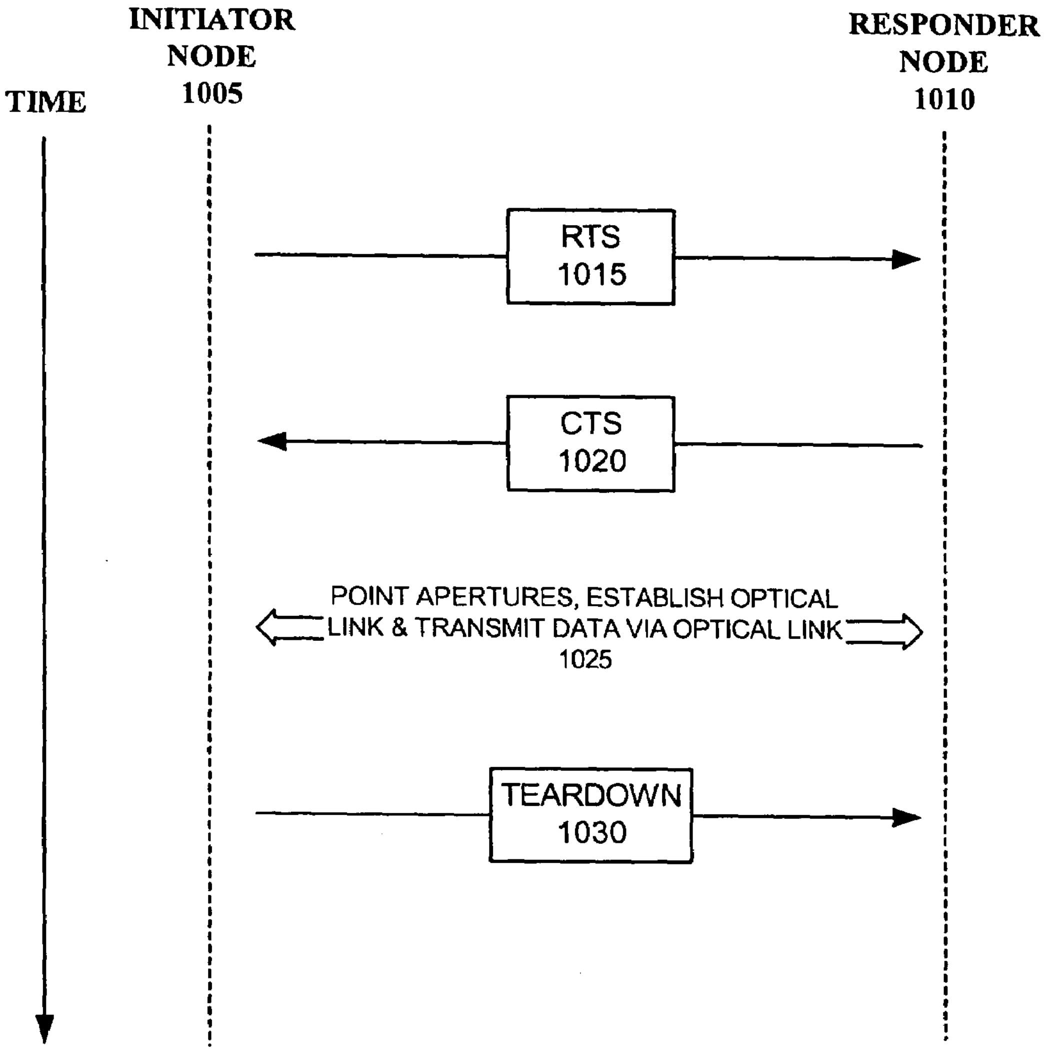
FIG. 10 is a diagram that graphically illustrates the exemplary optical link establishment and tear down process of FIG. 9 consistent with the present invention.
Figure 11:
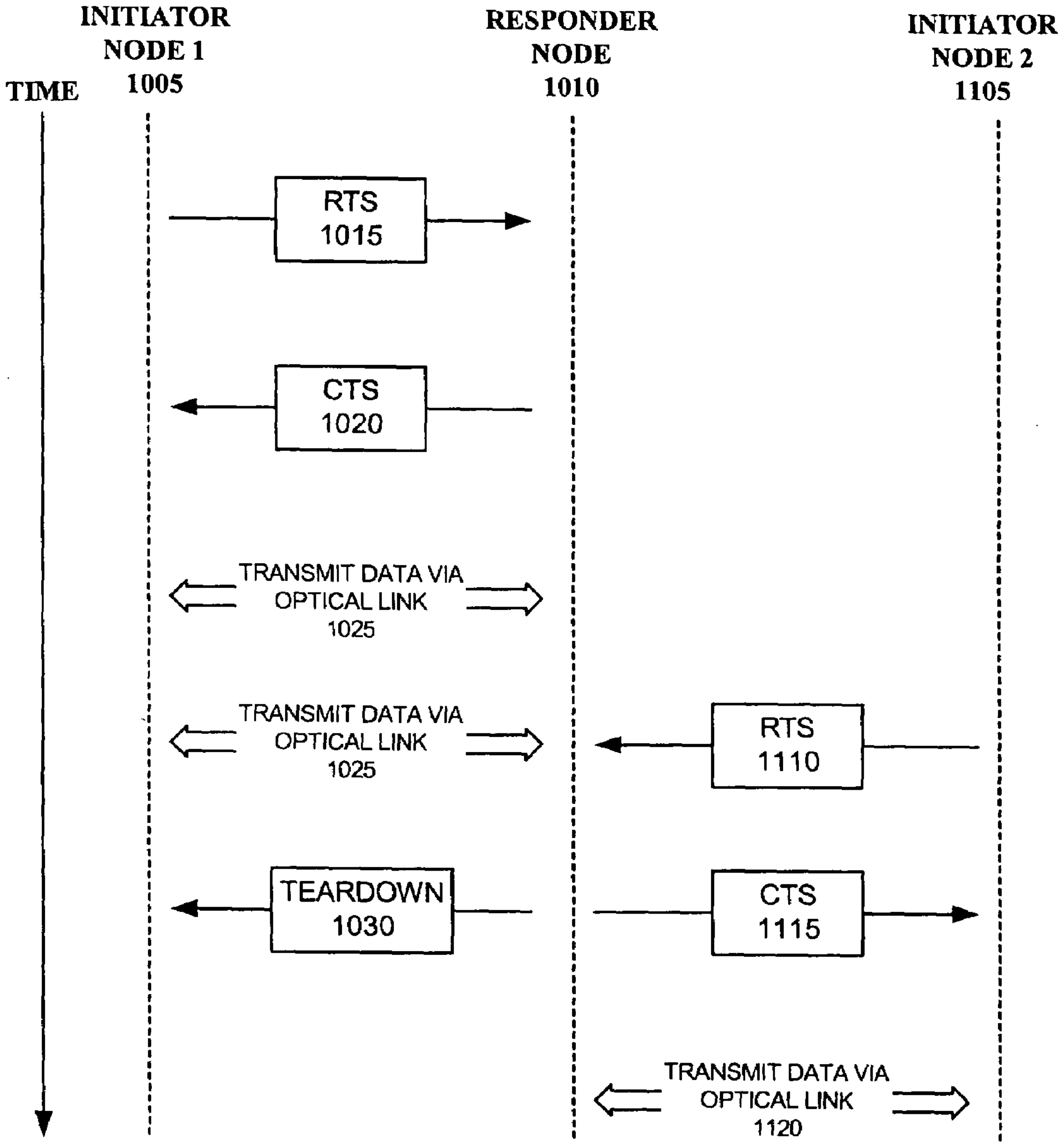
FIG. 11 is a diagram that graphically illustrates an exemplary optical link establishment and tear down process involving three optical nodes consistent with the present invention.

FIG. 9 is a flowchart that illustrates an exemplary process, consistent with the present invention, for establishing and tearing down an optical link between an initiator optical node and a responder optical node in optical ad-hoc sub-network 105. FIGS. 10 and 11 may also be referred to below for the purposes of graphically illustrating the exemplary process of FIG. 9.

The exemplary process may begin with an initiator optical node 1005 (FIG. 10) sending, via, for example, a RF channel, a RTS message 1015 (e.g., RTS message 600 illustrated in FIG. 6) to a designated responder node 1010 in ad-hoc sub-network 105 [act 905]. Initiator node 1005 may learn of the presence of responder node 1010 through, for example, notification messages broadcast by responder node 1010 notifying neighboring nodes of responder node's unique identifier, and its location and, possibly, its velocity and/or acceleration. The RTS message 1015 sent by the initiator node 1005 may include the node's unique identifier in the initiator node ID field 610 and the initiator node's 1005 location in the initiator node location field 625 and the initiator node's 1005 pitch, roll, and yaw motion in the initiator node pitch, roll, and yaw field 630.

The responder node 1010 may receive the RTS message 1015 and determine whether it is willing or able to establish a link with initiator node 1005 [act 910]. Responder node 1010 may be unable to establish a link with initiator node 1005 if, for example, all of responder node's 1010 optical link subsystems 410 are already employed communicating via optical links/channels with other optical nodes 205. In one optional exemplary implementation, if responder node 1010 is either unwilling or unable to establish an optical link with initiator node 1005, then responder node 1010 may choose not to return a CTS message to the initiator node 1005 [act 915]. Initiator node 1005 may wait a specified period of time after sending the RTS message 1015 [act 920] and may then return to act 905 above to send another RTS message 1015.

In another exemplary implementation, if responder node 1010 is either unwilling or unable to establish an optical link with initiator node 1005, then responder node 1010 may send a reject message 800 (not shown in FIG. 10) to initiator node 1005 [act 925]. Reject message 800 may specify the initiator node's 1005 unique identifier in initiator node ID field 610 and responder node's 1010 own unique identifier in responder node ID field 615. Reject message 800 may additionally include scheduling information in retry time field 810 that specifies when initiator node 1005 should retry sending another RTS message. Subsequent to receiving the reject message 800 from responder node 1010, initiator node 1005 may wait a specified period of time [act 930] before returning to act 905 above to send another RTS message 1015. The specified period of time may be preset at initiator node 1005, or may be retrieved from the optional retry time 810 included in reject message 800.

Returning to act 910, if responder node 1010 is willing and able to establish an optical link with initiator node 1005, then responder node 1010 may send a CTS message 1020, via a RF channel, to the initiator node 1005 agreeing to the establishment of the optical link [act 935]. CTS message 1020 may include the initiator node's 1005 unique identifier in the initiator node ID field 610, the responder node's 1010 unique identifier in the responder node ID field 615, the responder node's 1010 location in the responder node location field 710 and the responder node's 1010 pitch, roll, and yaw motion in the responder node pitch, roll, and yaw field 715.

In accordance with the location, pitch, roll and yaw information retrieved from RTS 1015 or CTS 1020 messages received at either the initiator node 1005 or the responder node 1010, the optical acquisition, pointing and tracking systems 455 of both nodes point their apertures towards one another and establish an optical link [act 940] (see 1025, FIG. 10). The location information retrieved from RTS 1015 or CTS 1020 may also include a three-dimensional velocity vector and a three-dimensional acceleration vector that may permit the initiator node 1005 and/or the responder node 1010 to steer its aperture along a predicted node trajectory, thus, increasing the odds of actually acquiring and locking in on the other node's optical aperture.

Initiator node 1005 and responder node 1010 may then communicate via the established optical link [act 945] (see 1025, FIG. 10). When either node wishes to terminate the optical link, the terminating node (e.g., initiator node 1005 shown in FIG. 10) may send a teardown message 1030, via the optical link, to the other node to notify the other node to tear down the established optical link [act 950]. Initiator node 1005 and responder node 1010 may terminate the optical link responsive to teardown message 1030. Alternatively, an optical link may simply fail of its own accord (e.g., when a cloud comes between two nodes, when equipment fails, etc.). Initiator node 1005 and responder node 1010 may then determine optical link failure by the loss of signals and may remove the link from service without any explicit control message.

In some implementations consistent with the invention, as shown in FIG. 11, responder node 1010 may begin establishing an optical link with another initiator node 1105 before terminating the optical link with initiator node 1005. Initiator node 1105 may send an RTS message 1110 to responder node 1010 while responder node 1010 is still communicating with initiator node 1005 via an optical link. Similar to the exemplary process illustrated in FIG. 10, responder node 1010 may respond with a CTS message 1115 accepting establishment of the optical link with initiator node 1105 during the same time period that responder node 1010 is terminating an optical link with initiator node 1005 using a teardown message 1030. Responder node 1010 and initiator node 1105 may transmit data via the established optical link (see 1120, FIG. 11).

CONCLUSION

Systems and methods consistent with the present invention may use a hybrid RF/optical channel access scheme, where nodes use RF messaging to request access to the optical channels and, in response to the RF messaging, the ad-hoc nodes may establish optical links for high-speed communication via optical channels. Optical links, consistent with the invention, permit very high data throughputs, such as multiple gigabits per second, in an ad-hoc environment, where nodes may be moving around and links may be created and terminated with a high degree of frequency. In some exemplary embodiments, establishment of the optical links may include steering of one or more optical apertures, such as, for example, an optical telescope, to point towards the node to which an optical link is going to be established. Steering of the optical aperture may, thus, permit optical link establishment with mobile optical nodes that may frequently change position.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. Furthermore, though the present invention has been described in the context of an ad-hoc network, the present invention may be employed in any environment where optical nodes contend for access to a shared optical communications medium. For example, the present invention may be used in a network that employs only optical fiber, or a mix of optical fiber and free-space optical links. Additionally, other electrically transmissive mediums may be used as an alternative to, or in conjunction with the RF medium used for transmitting the RTS and CTS messages of the present invention. Such other electrically transmissive mediums may include, for example (but are not limited to), a wired medium that may employ Ethernet, Internet, ATM or any other type of wired medium protocol.

While series of acts have been described with regard to FIG. 9, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method comprising:

sending a request message to establish an optical link from a first node to a second node via electrical signals over an electrically transmissive medium;

receiving a request granted message from the second node via electrical signals over the electrically transmissive medium, where the request granted message includes data associated with a location of the second node, and a velocity and/or an acceleration of the second node;

establishing the optical link between the first node and the second node based on receipt of the request granted message and based on the location and the velocity and/or the acceleration of the second node; and transmitting data between the first node and the second node via optical signals over the optical link.

2. The method of claim 1, where the optical link comprises a free-space link.

3. The method of claim 1, where the optical link comprises an optical fiber.

4. The method of claim 1, further comprising:

receiving a request denied message from the second node via electrical signals over the electrically transmissive medium, where the request denied message includes a time period that the first node is to wait before sending another request message to the second node.

5. The method of claim 1, where the electrical signals comprise radio-frequency (RF) signals and where the electrically transmissive medium comprises free-space.

6. The method of claim 1, where the electrically transmissive medium comprises a wired medium.

7. The method of claim 1, where establishing an optical link comprises:

pointing at least one steerable aperture at the second node; and establishing the optical link via the steerable aperture.

8. The method of claim 7, where the steerable aperture comprises a telescope.

9. A first node in a network, comprising:

a non-optical transceiver configured to:

send a request message to establish an optical link from the first node to a second node via electrical signals over an electrically transmissive medium, where the second node comprises a mobile node, and receive a request granted message from the second node via electrical signals over the electrically transmissive medium, where the request granted message includes data associated with a pitch, roll and yaw associated with the second node; and an optical subsystem configured to:

establish the optical link between the first node and the second node based on the pitch, roll and yaw associated with the second node, and transmit data between the first node and the second node via optical signals over the optical link.

10. A method, comprising:

receiving a first mobile node's location and velocity from the first mobile node via a non-optical channel;

pointing a steerable optical aperture towards the first mobile node based on the received location and velocity;

receiving the first mobile node's acceleration from the first mobile node via the non-optical channel, where pointing the optical aperture towards the first mobile node is further based on the received acceleration; and communicating with the first mobile node using an optical channel via the steerable optical aperture.

11. The method of claim 10, where the first mobile node's velocity includes a three dimensional velocity vector.

12. The method of claim 10, where the first mobile node's acceleration includes a three dimensional acceleration vector.

13. The method of claim 10, further comprising:

receiving pitch, roll and yaw information, associated with the first mobile node, from the first mobile node via the non-optical channel, where pointing the optical aperture towards the first mobile node is further based on at least one of the received pitch, roll or yaw information.

14. The method of claim 10, where the non-optical channel comprises a radio-frequency channel.

15. A method, comprising:

receiving a first mobile node's location and velocity from the first mobile node via a non-optical channel, pointing a steerable optical aperture towards the first mobile node based on the received location and velocity;

where the steerable optical aperture is associated with a second mobile node and where the method further comprises:

transmitting the second mobile node's location and velocity from the second mobile node to the first mobile node via the non-optical channel;

receiving data from the first mobile node using the optical channel; and communicating with the first mobile node using an optical channel via the steerable optical aperture.

16. A method, comprising:

receiving data from a first node via a first optical channel at a second node, where the second node is a mobile node, and where receiving the data from the first node at the second node includes:

pointing a first optical aperture towards the first node, and receiving the data from the first node via the first optical channel using the first optical aperture;

establishing a second optical channel with a third node from the second node based on a location and velocity of the second node, where establishing the second optical channel with the third node from the second node includes:

receiving a location and at least one of a velocity or an acceleration of the third node, receiving a pitch, roll, and yaw associated with the third node, pointing a second optical aperture towards the third node based on the location and velocity of the second node, the location and velocity of the third node, and the pitch, roll, and yaw associated with the third node; and forwarding the data from the second node to the third node using the second optical channel.

17. A method, comprising:

receiving a three dimensional velocity vector and a three dimensional acceleration vector, associated with movement of a first mobile node, from the first mobile node via a non-optical channel;

predicting a trajectory of the first mobile node based on the three dimensional velocity vector and the three dimensional acceleration vector;

pointing an optical aperture towards the first mobile node based on the predicted trajectory; and communicating with the first mobile node using an optical channel via the optical aperture.

18. The method of claim 17, where the non-optical channel comprises a radio-frequency channel.

19. The method of claim 17, where the optical aperture is associated with a second mobile node, where a three dimensional velocity vector and a three dimensional acceleration vector is associated with the second mobile node and where pointing the optical aperture towards the first mobile node is further based on the three dimensional velocity vector and three dimensional acceleration vector associated with the second mobile node.

20. The method of claim 19, where a pitch, roll and yaw is associated with the second mobile node and where pointing the optical aperture towards the first mobile node is further based on the pitch, roll and yaw associated with the second mobile node.

21. A method, comprising:

learning of a presence of a neighboring first mobile node in an ad-hoc network by receiving a first notification message from the first mobile node via a non-optical channel, where the first notification message includes an identifier of the first mobile node and a location of the first mobile node;

sending, via the non-optical channel, a first request message to establish an optical channel with the first mobile node;

receiving a first request granted message from the first mobile node via the non-optical channel responsive to the first request message;

pointing a steerable optical aperture towards the first mobile node, based on the location of the first mobile node and receipt of the first request granted message, to establish the optical channel; and communicating with the first mobile node via the optical channel and the steerable optical aperture.

22. The method of claim 21, where the notification message further includes at least one of a velocity or acceleration of the first mobile node.

23. The method of claim 22, where pointing the steerable aperture towards the first mobile node is further based on the at least one of the velocity or acceleration of the first mobile node.

24. The method of claim 22, further comprising:

predicting a trajectory of the first mobile node based on the location and the at least one of the velocity or acceleration of the first mobile node, where pointing the steerable optical aperture towards the first mobile node to establish the optical channel is further based on the predicted trajectory of the first mobile node.

25. The method of claim 21, further comprising:

learning of a presence of a neighboring second mobile node in the ad-hoc network by receiving a second notification message from the second mobile node via the non-optical channel, where the second notification message includes an identifier of the second mobile node and a location of the second mobile node, sending, via the non-optical channel, a second request message to establish an optical channel with the first mobile node;

receiving a second request granted message from the first mobile node via the non-optical channel responsive to the second request message;

pointing the optical aperture towards the second mobile node, based on the location of the second mobile node and receipt of the second request granted message, to establish the optical channel; and communicating with the second mobile node via the optical channel and the optical aperture.

* * * * *